(12) United States Patent
Kim

(10) Patent No.: US 8,747,237 B2
(45) Date of Patent: Jun. 10, 2014

(54) SLIDING BALL TYPE CONSTANT VELOCITY JOINT FOR VEHICLE

(75) Inventor: Pil Ki Kim, Dongjak-gu (KR)

(73) Assignee: Hyundai Wia Corporation, Gyeongsangnam-do (KR)

(*) Notice: Subject to any disclaimer, the term of this patent is extended or adjusted under 35 U.S.C. 154(b) by 0 days.

(21) Appl. No.: 13/335,293

(22) Filed: Dec. 22, 2011

(65) Prior Publication Data
US 2013/0130811 A1 May 23, 2013

(30) Foreign Application Priority Data

Nov. 21, 2011 (KR) ........................ 10-2011-0121464

(51) Int. Cl.
*F16D 3/227* (2006.01)
(52) U.S. Cl.
USPC .......................................... 464/146; 464/906
(58) Field of Classification Search
USPC .......................................... 464/144–146, 906
See application file for complete search history.

(56) References Cited

U.S. PATENT DOCUMENTS

| | | | |
|---|---|---|---|
| 568,577 A | 9/1896 | Marcuse | |
| 3,789,626 A * | 2/1974 | Girguis | 464/146 |
| 4,012,925 A * | 3/1977 | Krude | 464/146 |
| 4,541,819 A * | 9/1985 | Mazziotti | 464/144 |
| 5,685,777 A | 11/1997 | Schwarzler | |
| 6,071,195 A * | 6/2000 | Krude | 464/144 |
| 6,478,683 B1 | 11/2002 | Ouchi et al. | |
| 2007/0275784 A1 | 11/2007 | Harnischfeger | |
| 2009/0269129 A1 | 10/2009 | Harnischfeger | |
| 2009/0306059 A1 | 12/2009 | Tanaka et al. | |

FOREIGN PATENT DOCUMENTS

| | | |
|---|---|---|
| DE | 102005023035 A1 | 11/2006 |
| JP | 1-188719 | 7/1989 |
| JP | H08210374A A | 8/1996 |
| JP | 2007502945 A | 2/2007 |
| WO | 0208624 A1 | 1/2002 |
| WO | 2005028895 A1 | 3/2005 |

OTHER PUBLICATIONS

English Translation of Japanese Patent Publication No. 01-188719 Titled "Double-Offset Type Constant Speed Universal Joint", Dec. 19, 2013.
English Abstract of JPH08210374(A), Oct. 2, 2013.

* cited by examiner

*Primary Examiner* — Gregory Binda
(74) *Attorney, Agent, or Firm* — Stetina Brunda Garred & Brucker

(57) ABSTRACT

A sliding ball type constant velocity joint including an outer race having a track groove pair formed by a pair of track grooves on its inner surface, an inner race installed in the outer race having a track groove pair formed by a pair of track grooves on its outer surface to correspond to the track groove pair of the outer race, a plurality of balls installed in the track groove pairs formed in the outer race and the pair of track grooves formed in the inner race, for transmitting the rotational power of the outer race to the inner race, and a cage having windows for accommodating and supporting each two of the balls. The joint can minimize vehicle vibration by forming the track groove pairs on the outer and inner races to reduce a contact area between the inner race and the cage.

7 Claims, 5 Drawing Sheets

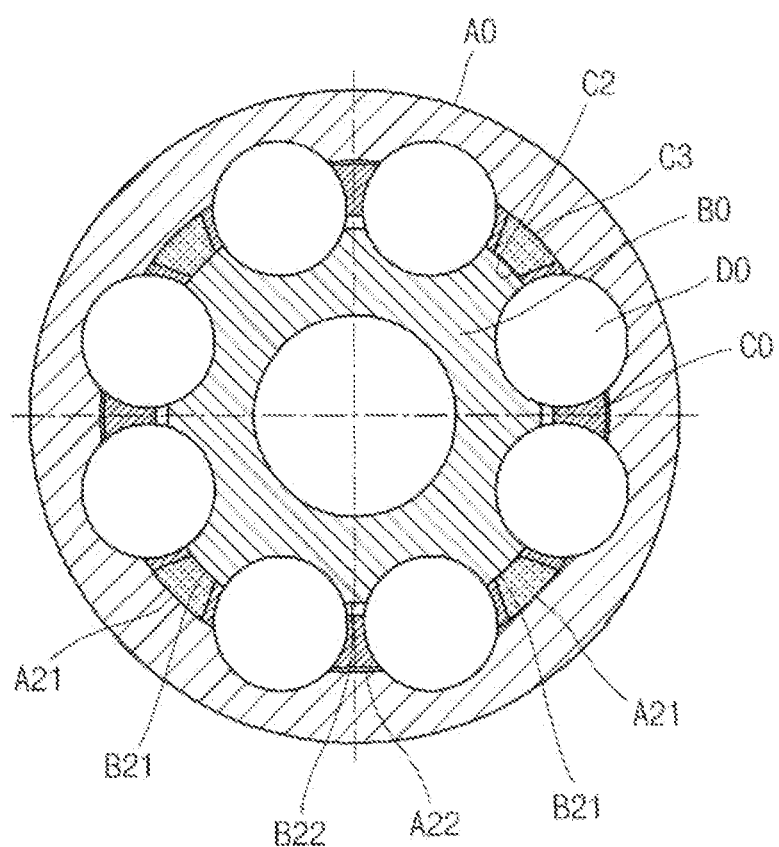

SLIDING BALL TYPE CONSTANT VELOCITY JOINT FOR VEHICLE

CROSS-REFERENCE TO RELATED APPLICATION

This application claims priority to and the benefit of Korean Patent Application No. 10-2011-0121464, filed on Nov. 21, 2011, the entire content of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a sliding ball type constant velocity joint for a vehicle, and more particularly, to a sliding ball type constant velocity joint for a vehicle, which can minimize vehicle vibration by forming a track groove pair by two track grooves of an outer race and an inner race to reduce a contact area between the inner race and a cage, and can reduce the manufacturing cost by reducing the number of processing steps of the cage by forming the number of windows of the cage to half that of balls.

2. Description of the Related Art

In general, a joint functions to transmit rotational power (torque) between two rotation shafts which meet each other at an angle. In the case of a propeller shaft having a small power transmission angle, a hook joint, a flexible joint, etc. are used, and in the case of the driving shaft of a front wheel drive vehicle having a large power transmission angle, a constant velocity joint is used.

Since the constant velocity joint can reliably transmit power at a constant velocity even when an angle between a driving shaft and a driven shaft is large, the constant velocity joint is mainly used for the axle shaft of an independent suspension type front wheel drive vehicle. When viewed from a shaft, a tripod type constant velocity joint is provided to one end of the shaft which faces an engine (the inboard-side end), and a fixed ball type joint is provided to the other end of the shaft which faces a tire (the outboard-side end).

FIG. 1 is a cross-sectional view illustrating a conventional sliding constant velocity joint for a vehicle.

As shown in FIG. 1, the conventional sliding constant velocity joint for a vehicle comprises an outer race 2 which rotates by receiving rotational power of the engine (not shown) and is defined with grooves as track grooves 21 on the inner surface thereof, an inner race 3 installed in the outer race 2, a plurality of balls 4 for transmitting the rotational power of the outer race 2 to the inner race 3, and a cage 5 for supporting the balls 4.

The outer race 2 has a track groove 21 parallel with the center axis and a cylindrical inner diameter 22.

The inner race 3 has a track groove 31 parallel with a central axel and a spherical outer diameter 32.

In general, the plurality of balls 4 include six or eight balls.

The cage 5 has a spherical outer surface 51 having a spherical portion and a linear portion and a spherical inner surface 52 having a spherical portion.

Hereafter, the operation of the conventional sliding ball type constant velocity joint for a vehicle constructed as mentioned above will be described.

As the rotational power outputted from an engine (not shown) is transmitted to the outer race 2 through a transmission (not shown) and then transmitted to the inner race 3 through and the ball 4, so that then a wheel (not shown) is rotated.

The balls 4, which are restrained by a grinding surface 53 of the cage 5 and are also restrained between the track groove 21 of the outer race 2 and the track groove 31 of the inner race 3, transmits rotational torque. In this case, the spherical inner surface 52 of the cage 5 restrains the spherical outer surface 32 of the inner race 3, and the grinding surface 53 of the cage 5 restrains the balls 4, thereby enabling axial sliding and articulated joint movement. When the joint is articulated, the cage 5 and the balls 4 are positioned on a bisecting line of an operating angle, thereby enabling constant velocity movement.

Therefore, as the balls 4 slidably move in the track groove 21 of the outer race 2, the joint is articulated to follow the displacement of the vehicle.

However, the conventional sliding ball type constant velocity joint is configured such that axial power transmitted to the axially moving inner race 3 is transmitted to the spherical inner surface 52 of the cage 5 through the spherical outer surface 32 of the inner race 3 to push the balls 4. That is to say, the inner race 3, the cage 5, and the balls 4 are subunits, which move in the same axial direction at the same time, may not absorb idle vibration generated from the vehicle during idling but may transmit the same to a vehicle body.

In addition, in the conventional sliding ball type constant velocity joint, since the number of windows of the cage is equal to the number of balls, the number of processing steps for forming the cage may be increased, thereby undesirably increasing the manufacturing cost.

BRIEF SUMMARY OF THE INVENTION

Accordingly, the present invention has been made to solve the above-mentioned problems occurring in the prior art, and an object of the present invention is to provide a sliding ball type constant velocity joint for a vehicle, which can minimize vehicle vibration by forming a track groove pair by two track grooves of an outer race and an inner race to reduce a contact area between the inner race and a cage, and can reduce the manufacturing cost by reducing the number of processing steps of the cage by forming the number of windows of the cage to half that of balls.

Another object of the present invention is to provide a sliding ball type constant velocity joint for a vehicle, which can reduce the manufacturing cost by reducing the number of processing steps of the cage by forming the number of windows of the cage to half that of balls.

In accordance with one aspect of the present invention, there is provided a sliding ball type constant velocity joint for a vehicle, including an outer race rotating by receiving rotational power from an end of the shaft and having a track groove pair formed by a pair of track grooves on its inner surface, an inner race installed in the outer race having a track groove pair formed by a pair of track grooves on its outer surface to correspond to the track groove pair of the outer race, a plurality of balls installed in the track groove pairs formed in the outer race and the pair of track grooves formed in the inner race, for transmitting the rotational power of the outer race to the inner race, and a cage having windows for accommodating and supporting each two of the balls.

The pair of track grooves of the outer race and the pair of track grooves of the inner race may include a plurality of track grooves, respectively.

In the outer race and the inner race, a second division angle (α) formed between a pair of track grooves forming the track groove pairs may be smaller than a first division angle (β) formed between adjacent track grooves between two adjacent track groove pairs.

The first division angle (β) and the second division angle (α) may satisfy the following equations:

$$\sin^{-1}\{D/P.C.D\} = a = (360/n) - (24/n)$$

$$\beta = (360/n) - a$$

where D is a diameter of each of the balls D0, P.C.D is a pitch circle diameter between centers of the balls D0, and n is the number of balls D0.

In the outer race, a spherical inner surface formed between adjacent track groove pairs may be smaller than a spherical inner surface formed between a pair of track grooves, and in the inner race, a spherical outer surface formed between adjacent track groove pairs may be smaller than a spherical outer surface formed between a pair of track grooves.

In the inner race, a spherical outer surface formed between adjacent track groove pairs may come into contact with a spherical inner surface of the cage, while a spherical outer surface formed between a pair of track grooves may not come into contact with a spherical inner surface of the cage.

The number of windows of the cage may be half the number of balls and each two of the balls may be supported by the windows of the cage.

A punching angle (γ) may be formed by the windows of the cage.

The punching angle (γ) may be defined in a range of 10 to 40 degrees.

As described above, in the sliding ball type constant velocity joint for a vehicle according to the present invention, vehicle vibration can be minimized by forming a pair of track grooves of an outer race and an inner race to reduce a contact area between the inner race and a cage. In addition, the manufacturing cost can be reduced by reducing the number of processing steps of the cage by forming the number of windows of the cage to half that of balls.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which:

FIG. 8 is a cross-sectional view taken along Y-Y FIG. 7.

DETAILED DESCRIPTION OF THE INVENTION

Hereinafter, a preferred embodiment of the present invention will be described with reference to the accompanying drawings with several exemplary or preferred embodiments thereof. Other advantages and features of the invention will also become apparent upon reading the following detailed description and upon reference to the accompanying drawings.

However, the following descriptions of such embodiments are intended primarily for illustrating the principles and exemplary constructions of the present invention, and the present invention is not specifically limited to these exemplary embodiments. Thus, one skilled in the art can appreciate or recognize that various modifications, substitutions and equivalents thereof can be made thereto without departing from the spirit and scope of the present invention.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As shown in FIGS. 2 to 6, the sliding ball type constant velocity joint for a vehicle according to an embodiment of the present invention includes an outer race A0 rotating by receiving rotational power from an end of the shaft and having a track groove pair formed by a pair of track grooves A1a and A1b on its inner surface, an inner race B0 installed in the outer race A0 and having a track groove pair formed by a pair of track grooves B1a and B1b on its outer surface to correspond to the track groove pair of the outer race A0, a plurality of balls D0 installed in the track groove pair formed in the outer race A0 and the track groove pair formed in the inner race B0, for transmitting the rotational power of the outer race A0 to the inner race B0, and a cage C0 having windows C1 for accommodating and supporting each two of the balls D0.

The track groove pair of the outer race A0 may include three, four or more track groove pairs. In this case, a second division angle (α) formed between a pair of track grooves A1a and A1b forming the track groove pair is smaller than a first division angle (β) formed between adjacent track grooves between two adjacent track groove pairs. In addition, since the track grooves A1a and A1b forming the track groove pair have constant sires, a cylindrical inner surface A21 formed between adjacent track grooves is larger than a cylindrical inner surface A22 thrilled between the pair of track grooves A1a and A1b.

Figure 1:
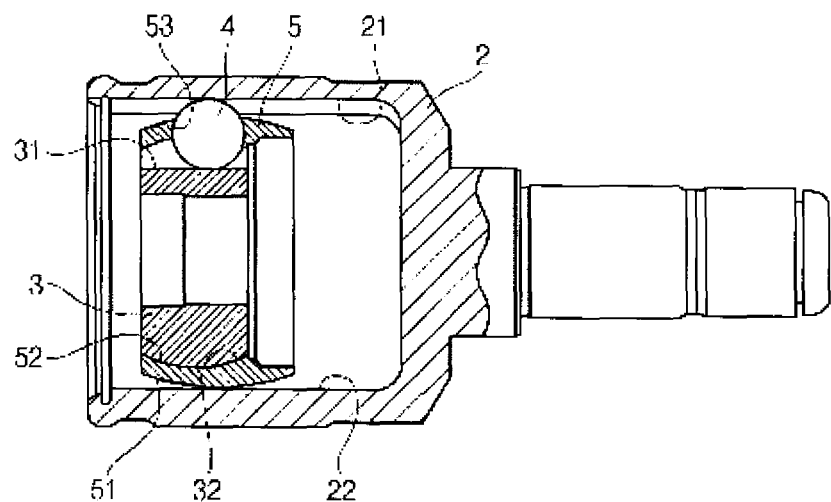
FIG. 1 is a cross-sectional view of a conventional sliding ball type constant velocity joint for a vehicle.
Figure 2:
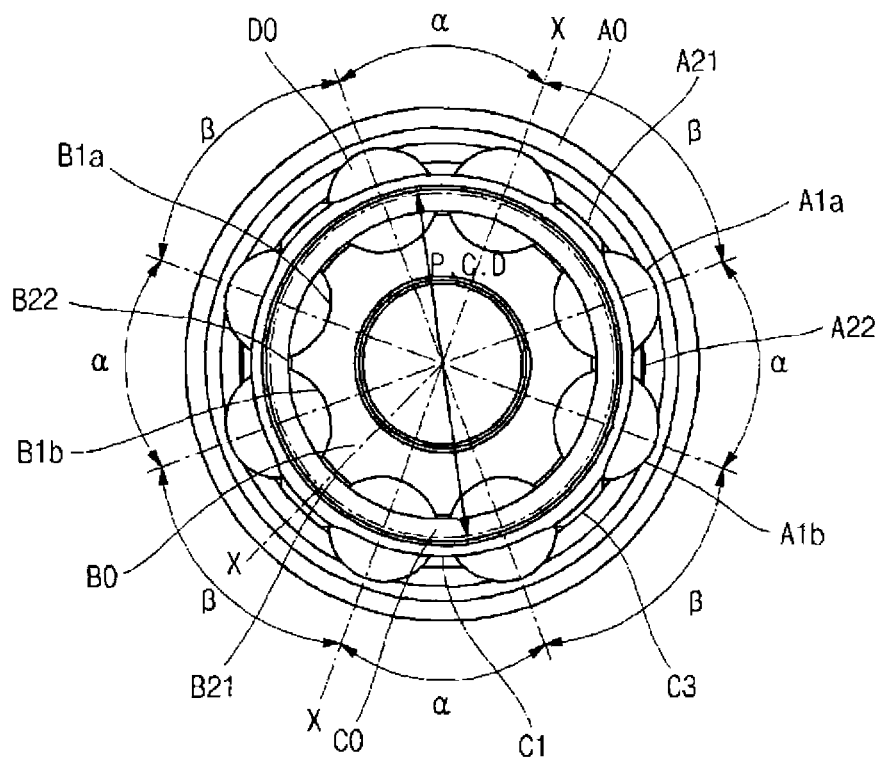
FIG. 2 is a front cross sectional view of a sliding ball type constant velocity joint for a vehicle according to an embodiment of the present invention.
Figure 3:
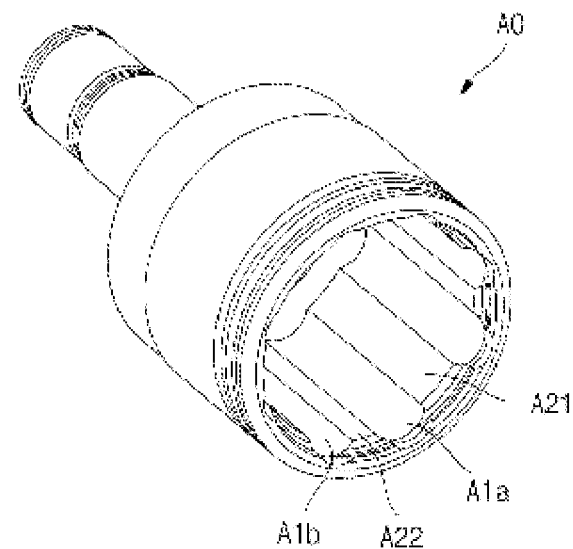
FIG. 3 is a perspective view of an outer race of the sliding ball type constant velocity joint shown in FIG. 2.
Figure 4:
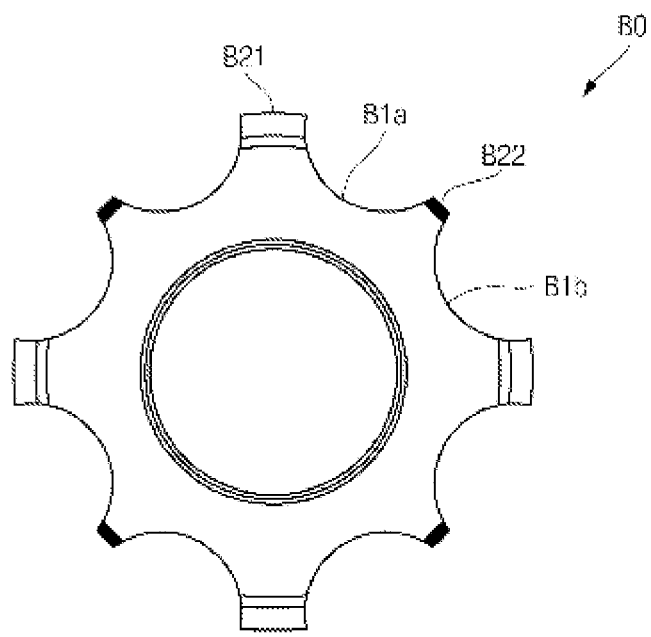
FIG. 4 is a front view of an inner race of the sliding ball type constant velocity joint shown in FIG. 2.
Figure 5:
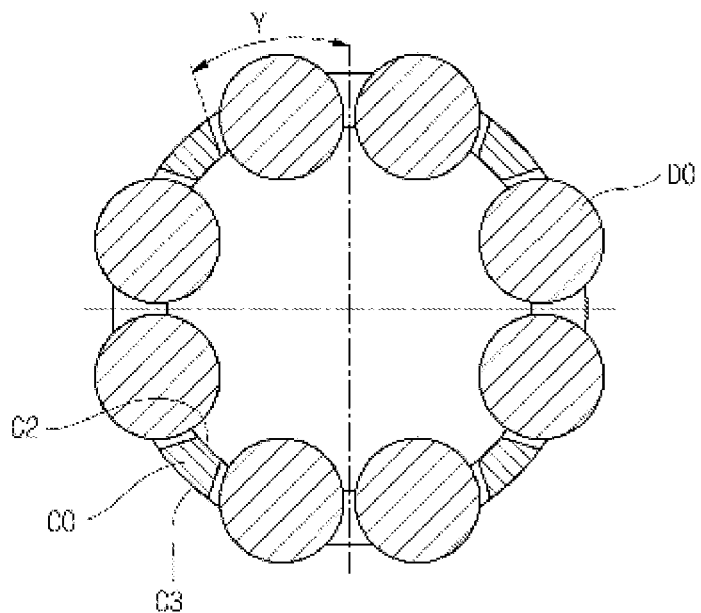
FIG. 5 is a front cross sectional view of a ball and a cage of the sliding ball type constant velocity joint shown in FIG. 2.
Figure 6:
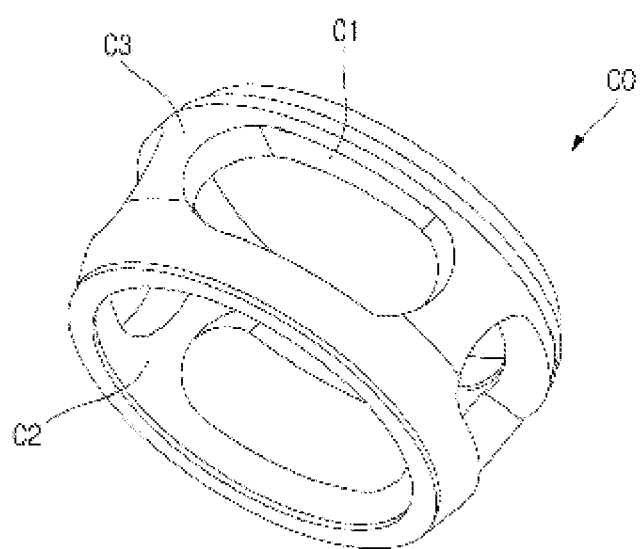
FIG. 6 is a perspective view of a cage of the sliding ball type constant velocity joint shown in FIG. 2.

According to another embodiment, and as shown in Figure 4, a spherical outer surface B21 formed between adjacent track grooves is larger than a spherical outer surface B22 formed between the pair of the track groove B1a and B1b.

According to one embodiment, the track groove pair of the inner race B0 may include three, four or more track groove pairs. In this case, a second division angle (α) formed between a pair of track grooves B1a and A1b forming the track groove pair is smaller than a first division angle (β) formed between adjacent track grooves between two adjacent track groove pairs. In addition, since the track grooves B1a and B1b forming the track groove pair have constant sizes, a spherical outer surface B21 formed between adjacent track grooves is smaller than a spherical outer surface B22 formed between the pair of the track grooves B1a and B1b (not shown).

Figure 7:
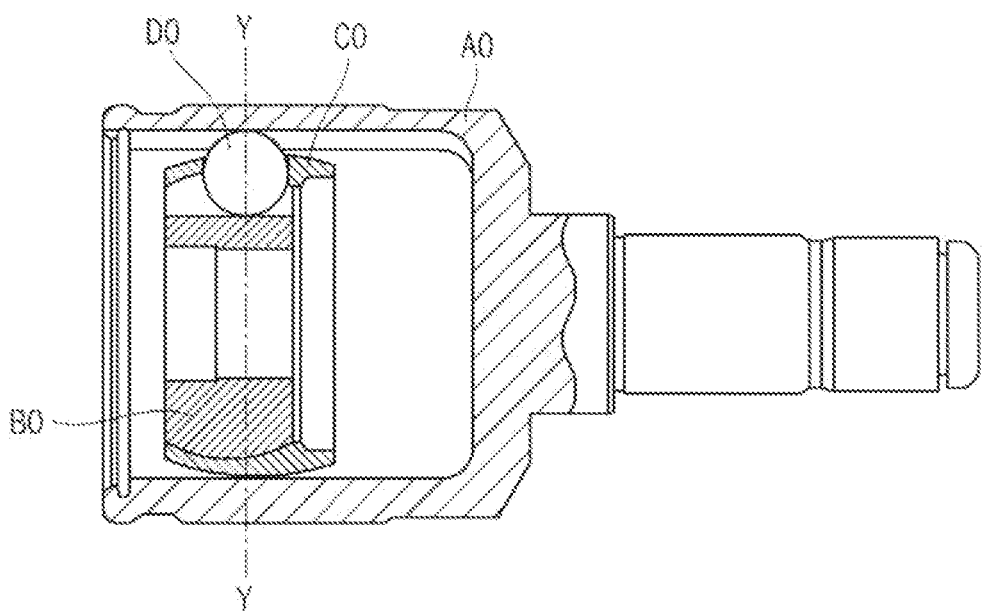
FIG. 7 is a cross-sectional view taken along X-X in FIG. 2.

Referring to FIGS. 7 and 8, in the inner race B0, a spherical outer surface B21 formed between adjacent track groove pairs comes into contact with a spherical inner surface of the cage, while a spherical outer surface B22 formed between a pair of track grooves B1a and B1b does not come into contact with a spherical inner surface C2 of the cage C0. Accordingly, a contact area between the inner race B0 and the cage C0 is relatively reduced, thereby minimizing vehicle vibration.

The number of windows C1 of the cage C0 is half the number of balk D0, and a punching angle ($\gamma$) is forrmed to secure proceasibility of the cage C0. The punching angle ($\gamma$) is the angle formed between the centerline of a respective cage window C1 and the axis defined by a cage end wall within a plane orthogonal to axial direction of the cage. The punching angle ($\gamma$) is defined in a range of 10 to 40 degrees, With this configuration, the strength of the cage C0 can be maintained while reducing the number of processing numbers of the cage C0.

Each two of the balls D0 are supported by the windows C1 of the cage C0. A first division angle ($\beta$) formed between the track groove pair A1b and A1b of the outer race A0 and the second division angle ($\alpha$) formed between the track groove pair B1a and B1b of the inner race B0 satisfy the following equations:

$$\sin^{-1}\{D/P.C.D\}=a=(360/n)-(24/n)$$

$$B=(360/n)-a$$

where D is a diameter of each of the balls (D0), P.C.D is a pitch circle diameter between centers of the balls (D0), and n is the number of balls (D0).

The aforementioned sliding ball type constant velocity joint operates as follows.

As the rotational power outputted from an engine (not shown) is transmitted to the outer race A0 through a transmission (not shown) and then transmitted to the inner race B0 through and the balls D0, so that then a wheel (not shown) is rotated.

Each two of the balls D0 are accommodated in and supported by the windows C1 of the cage C0. In addition, the balls D0 are restrained between a pair of track grooves A1a and A1b of the outer race A0 and a pair of track grooves B1a and B1b of the inner race B0 to transmit rotational torque to the inner race B0. In this case, the spherical inner surface C2 of the cage C0 restrains the spherical outer surface B21 of the inner race B0, and the windows C1 of the cage C0 restrain the balls D0, thereby enabling axial sliding and articulated joint movement.

Therefore, as the balls D0 slidably move in the track grooves A1a and A1b of the outer race A0 and the track grooves B1a and B1b of the inner race B0, the joint is articulated to follow the displacement of the vehicle.

When the joint is articulated, the cage C0 and the balls D0 are positioned on a bisecting line of an operating angle, thereby enabling constant velocity movement.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A sliding ball type constant velocity joint for a vehicle, comprising:

an outer race rotating by receiving rotational power from an end of a shaft and having a track groove pair formed by a pair of track grooves on its inner surface, the outer race including a cylindrical inner surface formed between adjacent track groove pairs and defining an arc length that is constant in an axial direction and is larger than an arc length defined by a cylindrical inner surface formed between a pair of track grooves;

an inner race installed in the outer race having a track groove pair formed by a pair of track grooves on its outer surface to correspond to the track groove pair of the outer race;

a plurality of balls installed in the track groove pairs formed in the outer race and the pair of track grooves formed in the inner race, for transmitting the rotational power of the outer race to the inner race; and a cage having windows, each window being sized and configured for accommodating and supporting two of the balls;

wherein in the inner race, a spherical outer surface formed between adjacent track groove pairs comes into contact with a spherical inner surface of the cage, while a spherical outer surface formed between a pair of track grooves does not come into contact with a spherical inner surface of the cage.

2. The sliding ball type constant velocity joint of claim 1, wherein the pair of track grooves of the outer race and the pair of track grooves of the inner race include a plurality of track grooves, respectively.

3. The sliding ball type constant velocity joint of claim 1, wherein in the outer race and the inner race, a second division angle ($\alpha$) formed between the radial centerlines passing through a pair of track grooves forming the track groove pairs is smaller than a first division angle ($\beta$) formed between the radial centerlines passing through adjacent track grooves in separate track groove pairs.

4. The sliding ball type constant velocity joint of claim 3, wherein the first division angle ($\beta$) and the second division angle ($\alpha$) satisfy the following equations:

$$\sin^{-1}\{D/P.C.D\}=a=(360/n)-(24/n)$$

$$\beta=(360/n)-a$$

where D is a diameter of each of the balls D0, P.C.D is a pitch circle diameter between centers of the balls D0, and n is the number of balls D0.

5. The sliding ball type constant velocity joint of claim 1, wherein in the inner race, a spherical outer surface formed between adjacent track groove pairs defines an arc length in a cross sectional plane that is larger than an arc length formed in a cross sectional plane by a spherical outer surface formed between a pair of track grooves.

6. The sliding ball type constant velocity joint of claim 1, wherein a punching angle ($\gamma$) is formed by the windows of the cage as the angle between the centerline of a respective cage window and the axis defined by a cage end wall within a plane orthogonal to axial direction of the cage.

7. The sliding ball type constant velocity joint of claim 6, wherein the punching angle ($\gamma$) is defined in a range of 10 to 40 degrees.

* * * * *